(12) United States Patent
Chour et al.

(10) Patent No.: US 6,565,718 B1
(45) Date of Patent: May 20, 2003

(54) MAGNETIC RECORDING MEDIUM WITH HIGH DENSITY, THIN DUAL CARBON OVERCOATS

(75) Inventors: Kueir-Weei Chour, San Jose, CA (US); Liji Huang, San Jose, CA (US); Jie-Ming Yu, Pleasanton, CA (US); Kuo-Hsing Hwang, San Jose, CA (US); Chung Shih, Cupertino, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/946,934

(22) Filed: Sep. 6, 2001

Related U.S. Application Data (62) Division of application No. 09/477,064, filed on Jan. 4, 2000, now Pat. No. 6,303,214.
(60) Provisional application No. 60/129,190, filed on Apr. 14, 1999.

(51) Int. Cl.$^7$ ................................................ G11B 5/851
(52) U.S. Cl. ............................ 204/192.15; 204/192.16; 427/131
(58) Field of Search ....................... 204/192.15, 192.16; 427/131

(56) References Cited

U.S. PATENT DOCUMENTS

| | | | | |
|---|---|---|---|---|
| 4,869,797 A | 9/1989 | Nagao et al. | ........... | 204/192.16 |
| 5,607,783 A | 3/1997 | Onodera | ................. | 428/694 T |
| 5,637,393 A | 6/1997 | Ueda et al. | ................. | 428/332 |
| 5,714,044 A | 2/1998 | Lal et al. | ................. | 204/192.16 |
| 5,785,825 A | 7/1998 | Hwang et al. | ......... | 204/192.16 |
| 5,837,331 A | * 11/1998 | Menu et al. | ................. | 427/569 |
| 5,837,357 A | 11/1998 | Matsuo et al. | .............. | 428/212 |
| 5,855,746 A | 1/1999 | Prabhakara et al. | ... | 204/192.16 |
| 6,110,329 A | * 8/2000 | Holleck et al. | ......... | 204/192.15 |
| 6,338,777 B1 | * 1/2002 | White | ................... | 204/192.15 |

* cited by examiner

Primary Examiner—Stevan A. Resan
(74) Attorney, Agent, or Firm—McDermott, Will & Emery (57) ABSTRACT

A magnetic recording medium is formed with dual carbon-containing protective layers having a combined thickness of less than about 100 Å with high corrosion resistance and superior magnetic performance. Embodiments of the present invention include sputter depositing a first protective layer of hydrogenated carbon at a density of at least 1.9 while applying a DC bias of about 250V to about 400V to the substrate, and sputter depositing a second protective layer comprising nitrogen-doped hydrogenated carbon on the first protective layer.

14 Claims, 5 Drawing Sheets

MAGNETIC RECORDING MEDIUM WITH HIGH DENSITY, THIN DUAL CARBON OVERCOATS

RELATED APPLICATIONS

This application is a Divisional of application Ser. No. 09/477,064, filed Jan. 4, 2000, now U.S. Pat. No. 6,303,214 which claims Priority from Provisional Application Ser. No. 60/129,190 filed Apr. 14, 1999.

TECHNICAL FIELD

The present invention relates to magnetic recording media, particularly rotatable magnetoresistance (MR) or giant magnetoresistance (GMR) recording media, such as thin film magnetic disks cooperating with a magnetic transducer head. The present invention has particular applicability to high areal density magnetic recording media designed for drive programs having a reduced flying height, or pseudo-contact/proximity recording.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

Conventional longitudinal recording media typically comprise a substrate, such as aluminum (Al) or an Al alloy, e.g., aluminum-magnesium (Al—Mg) alloy, plated with a layer of amorphous nickel-phosphorus (NiP). Alternative substrates include glass, ceramic, glass-ceramic, and polymeric materials and graphite. The substrate typically contains sequentially deposited on each side thereof at least one underlayer, such as chromium (Cr) or a Cr-alloy, e.g., chromium vanadium (CrV), a cobalt (Co)-base alloy magnetic layer, a protective overcoat typically containing carbon, and a lubricant. The underlayer, magnetic layer and protective overcoat, are typically sputter deposited in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms. The lubricant is typically dissolved in an organic solvent, applied and bonded to the carbon overcoat of the magnetic recording medium by techniques such as dipping, buffing, thermal treatment, ultraviolet (UV) irradiation and soaking. A significant factor in the performance of a lubricant topcoat is the bonded lube ratio which is the ratio of the amount of lubricant bonded directly to the carbon overcoat of the magnetic recording medium to the amount of lubricant bonded to itself or to a mobile lubricant. Desirably, the bonded lube ratio should be between 0.3 to 0.7 (e.g. about 0.5 (50%)) to realize a meaningful improvement in stiction and wear performance of the resulting magnetic recording medium.

The escalating requirements for high areal recording density impose increasingly greater requirements on thin film magnetic recording media in terms of coercivity, stiction, squareness, medium noise and narrow track recording performance. In addition, increasingly high areal recording density and large-capacity magnetic disks require smaller flying heights, i.e., the distance by which the head floats above the surface of the disk in the CSS drive (head-disk interface). For conventional media design, a decrease in the head to media spacing increases stiction and drive crash, thereby imposing an indispensable role on the carbon-protective overcoat.

There are various types of carbon, some of which have been employed for a protective overcoat in manufacturing a magnetic recording medium. Such types of carbon include hydrogenated carbon, graphitic carbon or graphite, and nitrogenated carbon or carbon nitride and hydrogen-nitrogenated carbon. These types of carbon are well known in the art and, hence, not set forth herein in great detail.

Generally, hydrogenated carbon or amorphous hydrogenated carbon has a hydrogen concentration of about 5 at. % to about 40 at. %, typically about 20 at. % to about 30 at. %. Hydrogenated carbon has a lower conductivity due to the elimination of the carbon band-gap states by hydrogen. Hydrogenated carbon also provides effective corrosion protection to an underlying magnetic layer. Amorphous carbon nitride, sometimes referred to as nitrogenated carbon, generally has a nitrogen to hydrogen concentration ratio of about 5:20 to about 30:0. Hydrogen-nitrogenated carbon generally has a hydrogen to nitrogen concentration ratio of about 30:10 to 20:10 (higher concentration of hydrogen than nitrogen). Amorphous (a) hydrogen-nitrogenated carbon can be represented by the formula a-$CH_xN_y$, wherein "x" is about 0.05 (5.0 at. %) to about 0.20 (20 at. %), such as about 0.1 (10 at. %) to about 0.2 (20 at. %), and "y" about 0.03 (3.0 at. %) to about 0.30 (30 at. %), such as about 0.03 (3.0 at. %) to about 0.07 (7.0 at. %). A particularly suitable composition is a-$CH_{15}N_{05}$. Graphitic carbon or graphite contains substantially no hydrogen and nitrogen.

The drive for high areal recording density and, consequently, reduced flying heights, challenges the capabilities of conventional manufacturing practices. For example, a suitable protective overcoat must be capable of preventing corrosion of the underlying magnetic layer, which is an electrochemical phenomenon dependent upon factors such as environmental conditions, e.g., humidity and temperature. In addition, a suitable protective overcoat must prevent migration of ions from underlying layers into the lubricant topcoat and to the surface of the magnetic recording medium forming defects such as asperities. A protective overcoat must also exhibit the requisite surface for wear resistance, lower stiction, and some polarity to enable bonding thereto of a lubricant topcoat in an adequate thickness.

Furthermore, as the head-disk interface decreases to less than about 1 μinch, it is necessary to reduce the thickness of the carbon-containing protective overcoat to below about 100 Å to improve performance of the magnetic recording medium and reduce the spacing loss between the read/write head and magnetic recording medium surface. However, when the thickness of the carbon-containing protective overcoat is reduced to below about 100 Å, corrosion protection is adversely affected. In addition, head crash is encountered because it exhibits very poor tribological properties and low reliability. Most GMR and MR media overcoats comprise a single layer of carbon material, such as amorphous hydrogenated carbon or amorphous nitrogenated carbon and exhibit adequate reliability at a thickness of about 125 Å to about 250 Å. However, as the thickness of the carbon-containing overcoat is reduced to below about 100 Å, head crash occurs, presumably because of lower wear resistance and the discontinuities formed in the sputter deposited layer.

Prior attempts have been made to reduce the thickness and increase the density of carbon-containing protective overcoats. Such techniques include plasma-enhanced chemical vapor deposition and ion-beam deposition. However, such prior attempts have met with a disadvantageously high defect count and lack of manufacturing feasibility.

Prabhakara et al., in U.S. Pat. No. 5,855,746, discloses a magnetic recording medium having a plurality of carbon-containing protective layers with an outer nitrogen-containing layer, wherein nitrogen is excluded from the initial carbon deposition for improved coercivity. Hwang et al., in U.S. Pat. No. 5,785,825, disclose a dual phase carbon overcoat including an initial amorphous carbon film on a magnetic layer and a doped amorphous carbon film sputter deposited on the amorphous carbon film. Lal et al., in U.S. Pat. No. 5,714,044, disclose a magnetic recording medium containing first and second carbon overcoats, wherein the second carbon overcoat is deposited under a nitrogen-containing atmosphere. Onodera, in U.S. Pat. No. 5,607,783, discloses a magnetic recording medium containing single or plural carbon-containing protective layers with increasing hydrogen content. Nagao et al., in U.S. Pat. No. 4,869,797 disclose a method of sputter depositing a carbon protective layer with a bias voltage of −10V to −100V applied in the vicinity of the support and magnetic layer.

In copending U.S. patent application Ser. No. 09/065,014 filed on Apr. 21, 1998, a multilayer protective overcoat is disclosed which contains a first hydrogenated carbon protective overcoat and a second protective overcoat of graphitic carbon or carbon nitride. In copending U.S. patent application Ser. No. 09/161,278 filed on Sep. 28, 1998, a magnetic recording medium is disclosed containing an amorphous carbon overcoat and a nitrogenated carbon overcoat deposited thereon.

There exists a continuing need for a magnetic recording medium comprising a protective overcoat capable of satisfying the imposing demands for high areal recording density, reduced head-disk interface and corrosion protection. There also exists a particular need for a magnetic recording medium having a protective overcoat with a thickness of less than about 100 Å affording superior corrosion protection, exhibiting excellent tribological properties at very low glide heights and having long term durability.

DISCLOSURE OF THE INVENTION

An advantage of the present invention is an effective magnetic recording medium comprising a protective overcoat having a thickness less than about 100 Å, providing superior corrosion protection, exhibiting excellent tribological properties at very low glide heights and having long term durability.

Additional advantages and other features of the present invention will be set forth in part in the description which follows and in part will become apparent to those having ordinary skill in the art upon examination of the following disclosure or may be learned from the practice of the present invention. The advantages of the present invention may be realized and obtained as particularly pointed out in the appended claims.

According to the present invention, the foregoing and other advantages are achieved in part by a magnetic recording medium comprising: a magnetic layer; a first protective layer comprising hydrogenated carbon having a density of at least about 1.9 on the magnetic layer; and a second protective layer comprising nitrogen-doped hydrogenated carbon on the first protective layer.

Another aspect of the present invention is a method of manufacturing a magnetic recording medium, the method comprising: sputter depositing a first protective layer on a magnetic layer overlying a non-magnetic substrate while applying a direct current (DC) bias to the substrate, the deposited first protective layer comprising hydrogenated carbon and having a density of at least about 1.9; and sputter depositing a second protective layer on the first protective layer, the second protective layer comprising nitrogen-doped hydrogenated carbon.

Embodiments of the present invention comprise depositing the second protective layer while applying a DC bias to the substrate such that the second protective layer has a density of at least about 1.85. Embodiments of the present invention further comprise depositing the first and second protective layers at a combined thickness of less than 100 Å, wherein the thickness of the first protective layer is less than the thickness of the second protective layer. For example, the thickness of the first protective layer can be about 20% to about 40% of the combined thickness and the thickness of the second protective layer can be about 60% to about 80% of the combined thickness. Embodiments of the present invention further comprise a programmable bias function, wherein the first and second protective layers are deposited at a substantially constant DC bias applied to the substrate as a single step function. Other embodiments of the present invention comprise depositing the first and second protective layers by applying a multistep function wherein the DC bias is reduced from a first value to a second value during the deposition process, e.g., at approximately midpoint, and depositing the first and second protective layers while applying the DC bias as a rampdown function wherein it is continuously reduced throughout deposition.

A further aspect of the present invention is a computer-readable medium bearing instructions for sputter depositing layers on a substrate, the instructions arranged, when executed by one or more processors, to cause the one or more processors to control a sputtering system to perform the manipulative steps of the inventive methodology disclosed herein.

Additional advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

The present invention enables the manufacture of magnetic recording media containing a dual protective overcoat system having a combined thickness less than about 100 Å exhibiting excellent tribological properties at a very low glide height, e.g., below about 1 μinch, long term durability and superior corrosion resistance. Embodiments of the present invention, therefore, enable the manufacture of MR and GMR magnetic recording media with improved magnetic recording performance and reduced spacing loss between the read/write head and magnetic recording surface by reducing the overcoat thickness to even less than 75 Å, e.g., less than about 45 Å.

Prior attempts to reduce the overall protective overcoat thickness to less than 100 Å to optimize magnetic performance sacrificed corrosion resistance, invited high defect counts and resulted in lack of manufacturing feasibility. In accordance with the present invention, a dual protective overcoat system is provided at a total thickness of less than 100 Å for optimum magnetic performance and superior corrosion resistance. In accordance with embodiments of the present invention, a first relatively thin protective layer is deposited on the magnetic layer by sputter deposition employing a relatively high direct current (DC) bias on the substrate, e.g., a bias of about 200V to about 400V, e.g., 300V to 400V. The relatively high substrate bias applied during sputter deposition of the first protective layer results in a protective layer having a density greater than that which would normally result from employing no or less substrate bias during deposition. For example, in depositing a first protective layer of hydrogenated carbon in accordance with conventional practices without a substrate bias or with a low substrate bias, the deposited layer would typically exhibit a density of about 1.7. However, in accordance with embodiments of the present invention, a relatively high substrate bias is applied during sputter deposition resulting in a hydrogenated carbon layer exhibiting a density of about 1.9 to about 2. A second relatively thick layer is then deposited on the first layer. The second layer can contain nitrogen-doped hydrogenated carbon. The use of a second nitrogen-doped hydrogenated carbon layer provides better CSS performance at the head-disc interface avoiding wear on the disk and the generation of debris. The inclusion of nitrogen in the second or upper protective overcoat prevents the generation of debris and, hence, minimizes maintenance and improves longevity.

The formation of a highly dense first protective layer on the magnetic layer substantially prevents migration of components from the magnetic layer, e.g., cobalt and nickel. The exact operative mechanism enabling the formation of a dense protective coating by application of a relatively high substrate bias is not known with certainty. However, it is believed that the application of a relatively high substrate bias knocks off loose particles, such as carbon particles, thereby preventing a clean surface for deposition and growth of a denser layer than that deposited on loose particles. The second protective layer can, but need not, be deposited at a relatively high substrate bias and typically exhibits a density which is equal or no less than 0.05 less than the density of the first protective layer.

Embodiments of the present invention comprise depositing a first layer of hydrogenated carbon having a hydrogen concentration of about 10 to about 30 at. %, such as about 15 to about 25 at. %, e.g., about 20 at. %. The second or top protective layer can comprise nitrogen-doped hydrogenated carbon containing about 2 to about 8 at. % nitrogen, such as about 4 to about 6 at. % nitrogen, and about 10 to about 20 at. % hydrogen, e.g., about 12 to about 14 at. % hydrogen. The relative thickness of the first and second layers can be optimized in a particular situation. It was found suitable to deposit the first and second protective layers such that the first layer has a thickness of about 20% to about 40% of the overall thickness, where the second layer has a thickness of about 60% to about 80% of the overall thickness of the protective layers.

Magnetic recording media in accordance with the present invention can comprise any conventional substrate, such as NiP/Al or an NIP/Al alloy substrate, Al or an Al alloy substrate, or a glass, ceramic, glass-ceramic or polymeric substrate. The present invention can be implemented employing any of the various seedlayers, underlayers, magnetic layers and lubricant topcoats conventionally employed in manufacturing magnetic recording media. For example, embodiments of the present invention comprise the use of a Cr or Cr alloy underlayer or underlayers, Co-alloy magnetic layers and (PFPE) lubricants for enhance durability.

Figure 1:
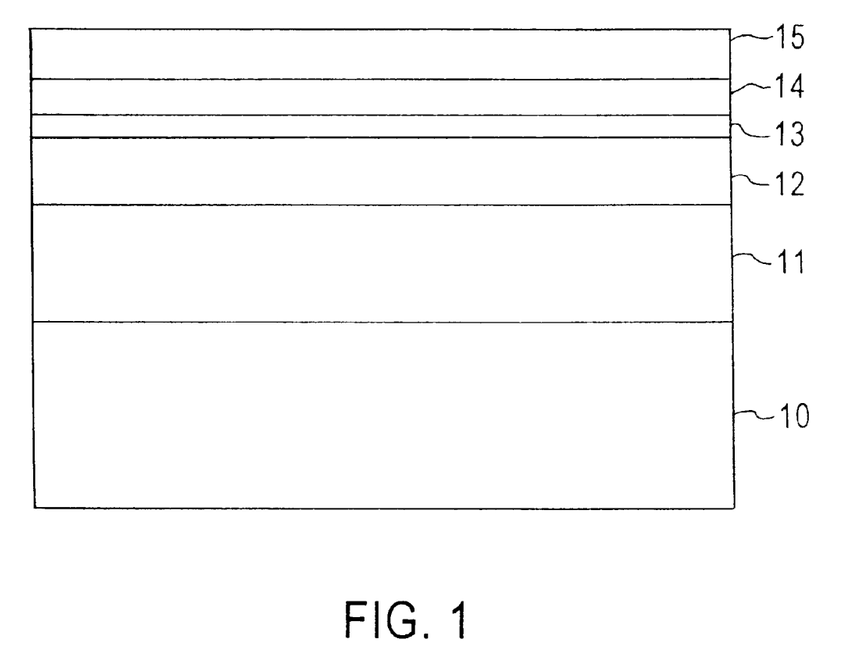
FIG. 1 schematically illustrates a magnetic recording medium in accordance with an embodiment of the present invention.

An embodiment of the present invention is schematically illustrated in FIG. 1 and comprises a substrate 10, e.g., Al, an Al alloy, a polymer, a glass, a ceramic, or a glass-ceramic, having sequentially deposited on each side thereof an underlayer 11 and a magnetic layer 12, e.g., a cobalt alloy, on underlayer 11.

In accordance with the present invention, a first protective layer 13, e.g., a hydrogenated carbon layer, is deposited on magnetic layer 12 at a high substrate bias, e.g., about 300V. The first protective layer 13 typically has a density of about 1.9 to about 2. A second protective layer 14 is then deposited on first protective layer 13. Second protective layer 14 can comprise nitrogen-doped hydrogenated carbon. A lubricant topcoat 15 is then applied. Although not illustrated, embodiments of the present invention can comprise conventional seed layers and composite underlayers. It should be understood that the layers 11, 12, 13, 14, 15 are sequentially deposited on both sides of substrate 10 in a conventional manner.

The combined thicknesses of protective overcoats 13 and 14 illustrated in FIG. 1 is less than 100 Å for optimum tibological performance. In addition, due to the high density and hardness, the protective overcoat system of the present invention exhibits superior corrosion resistance, preventing migration of ions from underlying layers.

Figure 2:
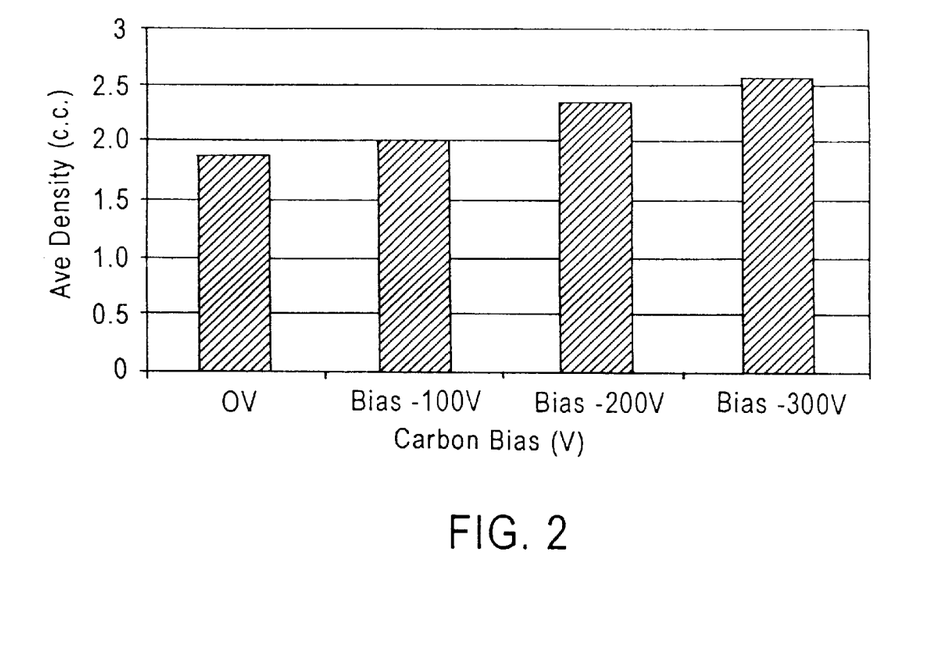
FIG. 2 is a graph showing the change in density measured on the upper nitrogen-doped hydrogenated carbon layer of the inventive dual sputter deposited layers as a function of bias voltage.

Testing was conducted at various substrate biases to illustrate the impact of bias on the substrate during sputter deposition of a dual protective overcoat system in accordance with the present invention. The results are reported in FIG. 2 and illustrate the increase in average density measured on the upper nitrogen-doped hydrogenated carbon layer of an inventive sputtered dual layer protective overcoat system with increasing substrate bias.

Figure 3:
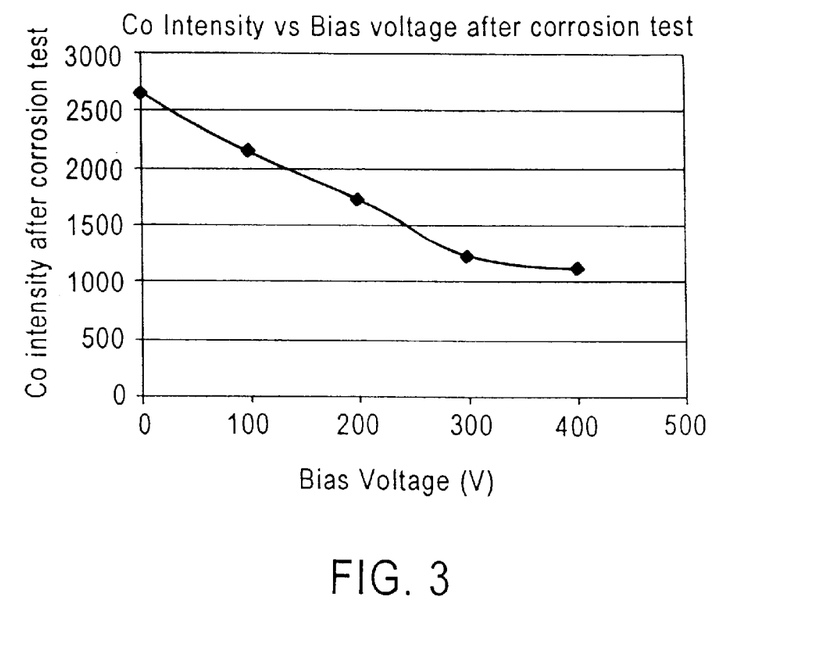
FIG. 3 is a graph showing cobalt intensity as a function of bias voltage.

FIG. 3 confirms that the denser films deposited at a high substrate bias exhibit reduced corrosion. Manifestly, the higher substrate bias voltages contributed to superior surface coverage of the magnetic layer and reduced cobalt counts.

Figure 4:
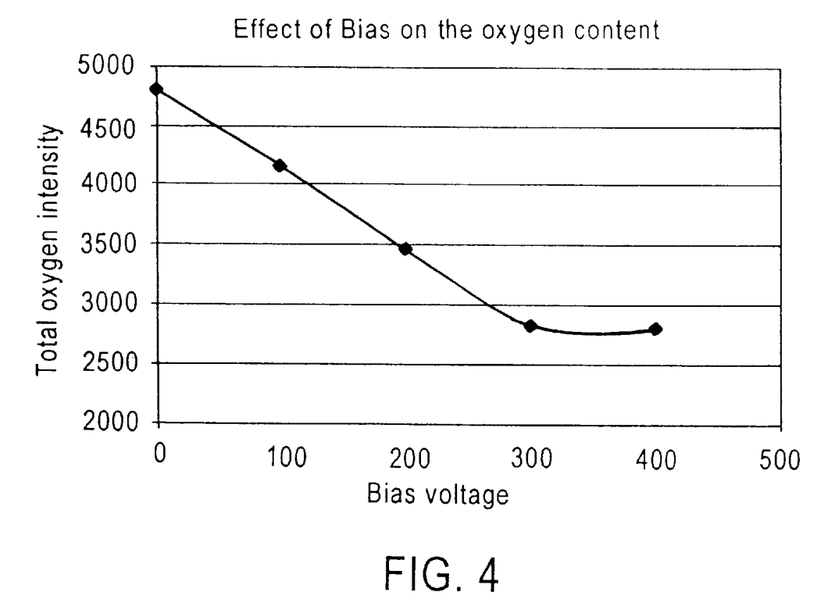
FIG. 4 is a graph showing oxygen content as a function of bias voltage.

Another advantage of the present invention is a reduction in oxygen concentration in the protective overcoat. Oxygen is known to be detrimental for inducing corrosion. Testing conducted demonstrated reduced oxygen intensity with increased substrate bias during sputter depositing a dual overcoat system in accordance with the present invention as shown in FIG. 4.

Figure 5:
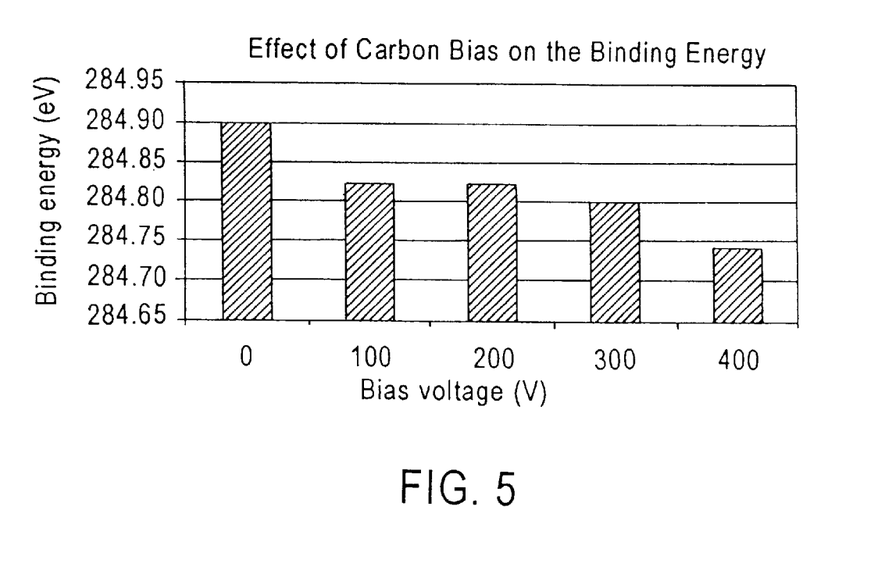
FIG. 5 is a graph showing binding energy as a function of bias voltage.

Another advantage of the present invention is increased durability attendant upon increased substrate bias. FIG. 5 illustrates the increase of the sp3 binding characteristics among carbon atoms, thereby improving the durability of the inventive dual protective overcoat system. The increase in density, reduction of oxygen concentration and increased binding strength contribute to improved corrosion resistance.

In an embodiment of the present invention, a programmable bias is employed during the deposition of the dual carbon layers. The programmable bias can be applied as a multistep function, rampup function or rampdown function. The programmable bias feature enables depositing a high bias carbon for the bottom layer employing either step or rampdown function and depositing a lower bias carbon for a top layer employing a rampdown bias function. Thus, the programmable bias feature advantageously enables deposition of the harder carbon layer as the bottom layer while depositing a less dense film as the top layer. In this way, the protective overcoat of the present invention is optimized so that the bottom denser film provides superior corrosion protection while the top less dense layer provides a friendly surface for the head-disc interface.

A programmable bias can be applied at each station and can include: (a) a high bias step function for sputter depositing the first carbon layer with increased density and superior corrosion resistance, employing a bias of about 250V to about 400V; and (b) a low, step bias or rampdown function for the second carbon layer, employing a step bias in the range of about 100V to about 250V and up to 50V to complete deposition.

Figure 6:
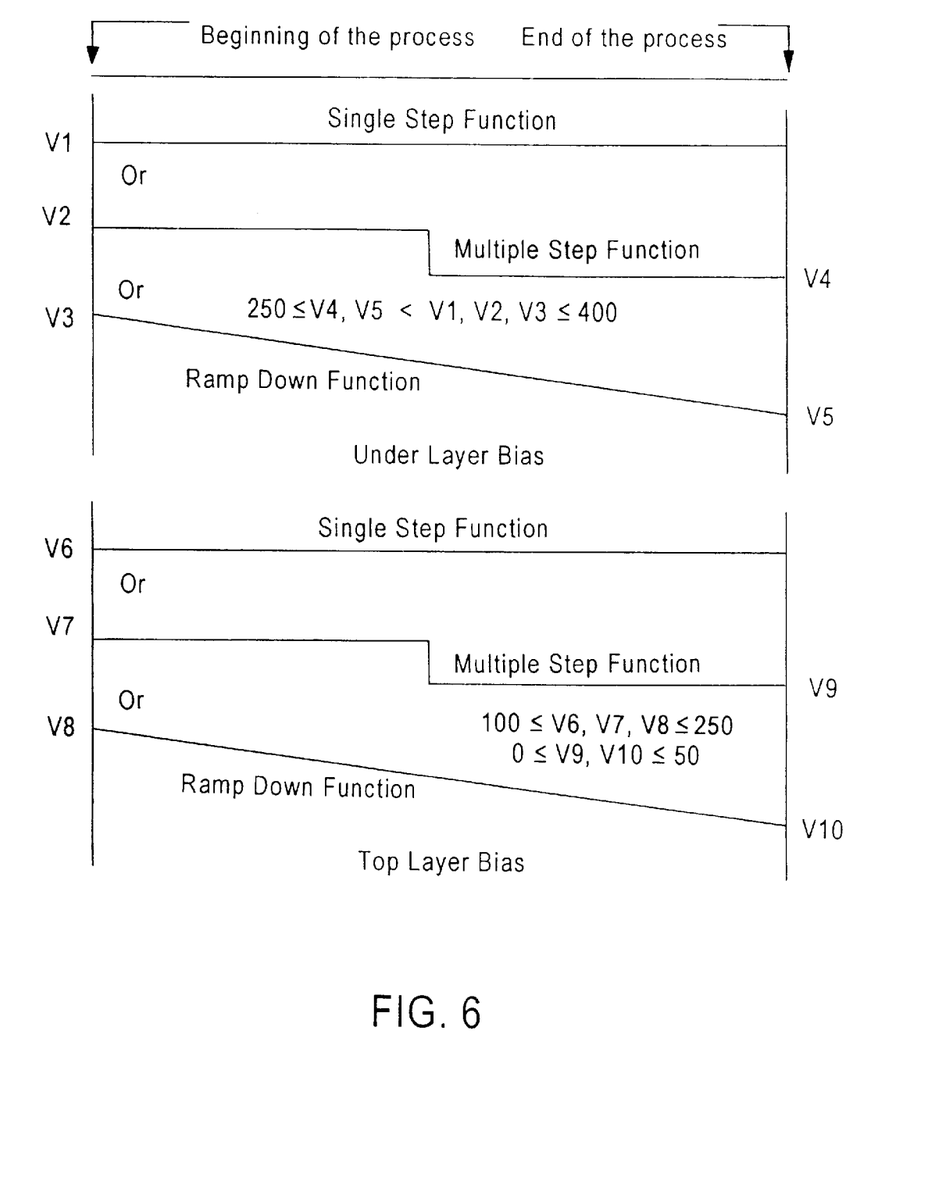
FIG. 6 illustrates an example of a programmable bias function in accordance with an embodiment of the present invention.

An example of a programmable bias function in accordance with an embodiment of the present invention is illustrated in FIG. 6. The multiple step function shift occurs about about mid point of the deposition for the particular layer.

Figure 7:
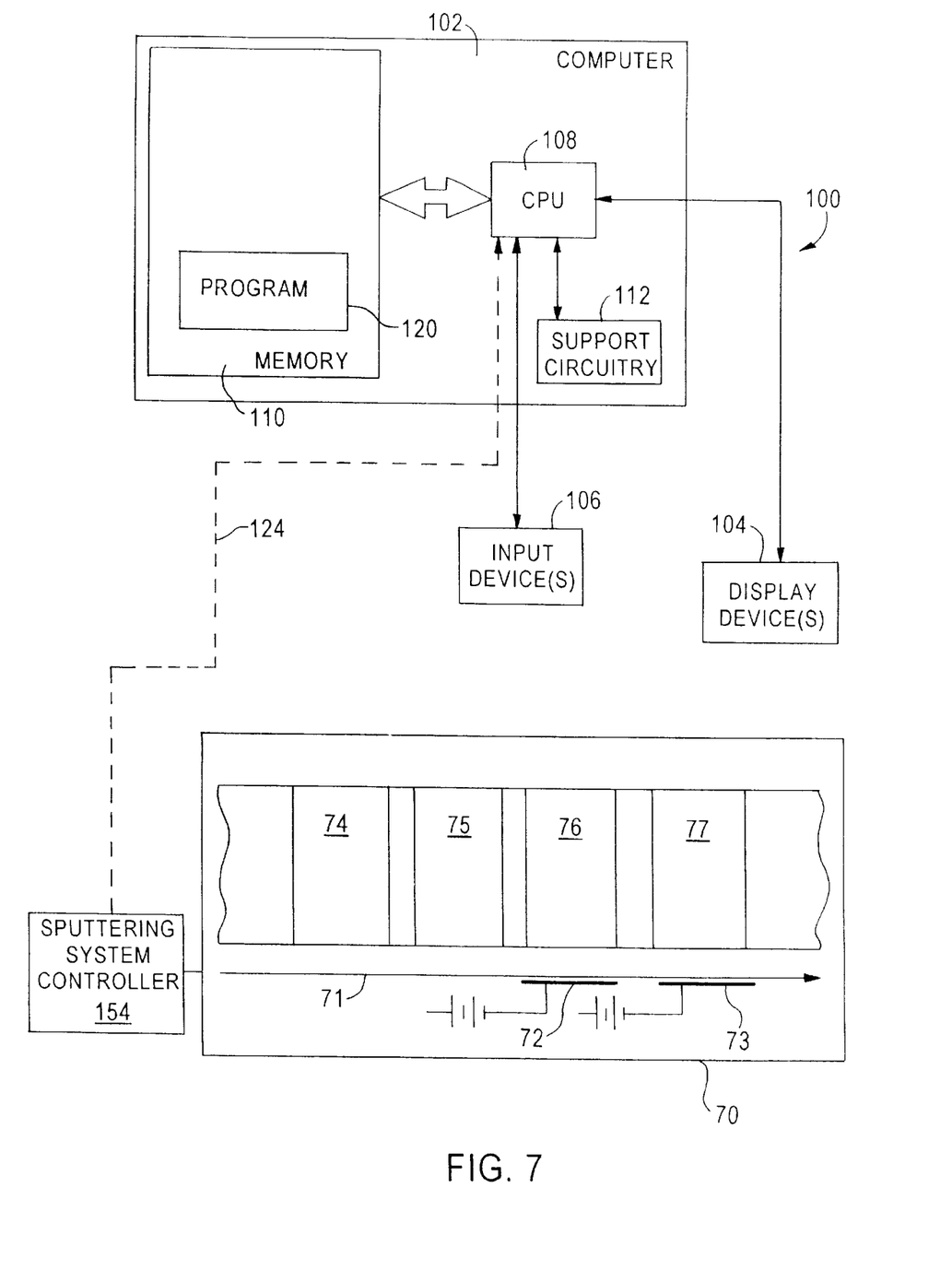
FIG. 7 depicts a block diagram of a computer system configured for controlling sputter deposition in accordance with an embodiment of the present invention.

Another aspect of the present invention relates to the use of computer system to control a sputtering system for sequentially depositing layers in manufacturing a magnetic recording medium. FIG. 7 depicts a general purpose computer system 100 configured to execute a software for controlling sputtering system 70. The computer system 100 contains a computer 102, one or more display devices 104, and one or more input devices 106. The computer 102 contains a central processing unit (CPU) 108 such as an Intel 486 microprocessor, a memory 110 and asserted support circuitry 112 such as a math co-processor, power supply, and the like. Such computer systems are commonly known as personal computers, however, the present invention is not limited to personal computers and may, in fact, be implemented on workstations, minicomputer, mainframes, and supercomputers. The input devices 106 used with such computers include a keyboard, a mouse, trackball and the like. The display devices 104 include computer monitors, printers and plotters.

Computer system 100 also includes a memory 110, such as a random access memory (RAM) or other dynamic storage device for storing information and instructions to be executed by CPU 108. Memory 110 also may be used for storing temporary variables or other intermediate information during execution of instructions to be executed by CPU 108. Memory 110 further includes a read only memory (ROM) or other static storage device for storing static information and instructions for CPUT 108. Memory 110 may also include a storage device, such as a magnetic disk or optical disk, provided for storing information and instructions.

The interface 124 allows the computer system 100 to communicate with the sputtering system 70, specifically with sputtering controller 154. The sputtering system 70 could comprise an in-line type of sputtering system comprising sequential deposition and, when appropriate, heating chambers. In the embodiment depicted in FIG. 7, sputtering system 70 comprises, inter alia, conveyor 71 on which a substrate is placed as it is conveyed past various sputter depositing chambers, e.g., chamber 74 for depositing an underlayer chamber 75 for depositing a magnetic layer 76 for depositing the first protective layer and chamber 77 for depositing the second protective layer. Bias rings 72 and 73 are positioned to provide a voltage on the substrate while sputter depositing the first and second protective layers which can also be implemented in a single deposition chamber. Sputtering system controller 154 controls motion of conveyor 71 and the various sputtering parameters and conditions.

According to an embodiment of the present invention, sputtering is provided by computer system 100 controlling sputtering system 70 in response to CPU 108 executing one or more sequences of one or more instructions contained in a program 120 in memory 110. For example, instructions may be read into main memory from another computer-readable medium, such as a storage device. Execution of the sequences of instructions contained in memory 110 causes CPU 108 to perform the process steps described herein. One or more processors in a multi-processing arrangement may also be alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to CPU 108 for execution. Such a medium may take many forms, including but not limited to, non-volatile media, volatile media, and transmission media. Non-volatile media include, for example, optical or magnetic disks, such as a storage device. Volatile media include dynamic memory, such as a main memory. Transmission media include coaxial cables, copper wire and fiber optics, including the wires that comprise a system bus. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic mediu,, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to CPU 108 for execution. For example, the instructions may initially be borne on a magnetic disk of a remote computer. The remote computer can load the instructions into its dynamic memory and send the instructions over a telephone line using a modem. A modem (not shown) local to computer system 100 can receive the data on the telephone line and use an infrared transmitter to convert the data to an infrared signal. An infrared detector as an input device 106 can receive the data carried in the infrared signal and place the data on the system bus, which carries the data to memory 110, from which CPU 108 retrieves and executes the instructions. The instructions received at memory 110 may optionally be stored on storage device either before or after execution by CPU 108.

The present invention provides magnetic recording media having a protective carbon overcoat at a thickness significantly less than 100 Å, e.g. less than 45 Å, for MR and MRG recording with optimum magnetic performance and improved corrosion resistance by sputter depositing a first protective carbon overcoat under a high substrate bias for increased density and hardness, reduced oxygen concentration and increased sp3 binding characteristics for improved corrosion resistance. Magnetic recording media in accordance with the present invention exhibit excellent tribological properties at very low glide heights, e.g. less than about 1 μinch, with long term durability.

The present invention can be advantageously employed to produce any of various types of magnetic recording media, including thin film disks. The present invention is particularly applicable in producing high areal recording density magnetic recording media requiring a low flying height.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A method of manufacturing a magnetic recording medium, the method comprising:
   sputter depositing a first protective layer to a first thickness on a magnetic layer overlying a non-magnetic substrate while applying a direct current (DC) bias to the substrate, the deposited first protective layer comprising hydrogenated carbon and having a density of at least about 1.9; and
   sputter depositing a second protective layer to a second thickness on the first protective layer while applying a DC bias to the substrate, the second protective layer comprising nitrogen-doped hydrogenated carbon, wherein the second thickness is greater than the first thickness.

2. The method according to claim 1, comprising depositing the second protective layer at a density less than that of the first protective layer.

3. The method according to claim 1, wherein the first and second protective layers have a combined thickness of less than about 100 Å.

4. The method according to claim 3, comprising:
   sputter depositing the first protective layer to a thickness of about 20% to about 40% of the combined thickness; and
   sputter depositing the second protective layer to a thickness of about 60% to about 80% of the combined thickness.

5. The method according to claim 1, comprising sputter depositing the first protective layer while applying a DC bias of about 250V to about 400V to the substrate.

6. The method according to claim 5, comprising:
   (a) applying a DC bias to the substrate of about 250 to about 400V while sputter depositing the entire first protective layer;
   (b) applying a DC bias of about 250V to about 400V to the substrate while sputter depositing substantially half of the thickness of the first protective layer and applying a reduced DC bias of about 250V or less while sputter depositing the remainder of the first protective layer; or
   (c) sputter depositing the first protective layer by applying an initial DC bias of about 250V to about 400V to the substrate and gradually decreasing the DC bias until completely sputter depositing the first protective layer.

7. The method according to claim 5, comprising:
   (a) applying a DC bias of about 100V or less to the substrate while sputter depositing the entire second protective layer;
   (b) applying a first DC bias of about 100V or less to the substrate while sputter depositing substantially half of the thickness of the second protective layer and applying a second DC bias, less than the first DC bias, to the substrate while sputter depositing the remainder of the second protective layer; or (c) sputter depositing the second protective layer by applying an initial DC bias of about 250V or less to the substrate and gradually decreasing the DC bias to about 50V or less until completely depositing the second protective layer.

8. A computer-readable medium bearing instructions for sputter depositing layers on a substrate, the instructions arranged, when executed by one or more processors, to cause the one or more processors to control a sputtering system to perform the steps of:

sputter depositing a first protective layer to a first thickness on a magnetic layer overlying a non-magnetic substrate while applying a direct current (DC) bias to the substrate, the first protective layer comprising hydrogenated carbon and having a density of at least about 1.9; and sputter depositing a second protective layer to a second thickness on the first protective layer while applying a DC bias to the substrate, the second protective layer comprising nitrogen-doped hydrogenated carbon, wherein the second thickness is greater than the first thickness.

9. The computer-readable medium according to claim 8, wherein said instructions are arranged for depositing the second protective layer at a density less than that of the first protective layer.

10. The computer-readable medium according to claim 8, wherein the instructions are arranged for depositing the first and second protective layers at a combined thickness of less than about 100 Å.

11. The computer-readable medium according to claim 10, wherein the instructions are arranged for:

sputter depositing the first protective layer to a thickness of about 20% to about 40% of the combined thickness; and sputter depositing the protective layer to a thickness of about 60% to about 80% of the combined thickness.

12. The computer-readable medium according to claim 8, wherein the instructions are arranged for sputter depositing the first protective layer while applying a DC bias of about 250V to about 400V to the substrate.

13. The computer-readable medium according to claim 12, wherein the instructions are arranged for:

(a) applying a DC bias to the substrate of about 250V to about 400V while sputter depositing the entire first protective layer;

(b) applying a DC bias of about 250V to about 400V to the substrate while sputter depositing substantially half of the thickness of the first protective layer and applying a reduced DC bias of about 250V or less while sputter depositing the remainder of the first protective layer; or (c) sputter depositing the first protective layer while applying an initial DC bias of about 250V to about 400V to the substrate and gradually decreasing the DC bias until completely sputter depositing the first protective layer.

14. The computer-readable medium according to claim 12, wherein the instructions are arranged for:

(a) applying a DC bias of about 100V or less to the substrate while sputter depositing the entire second protective layer;

(b) applying a first DC bias of about 100V or less to the substrate while sputter depositing substantially half of the thickness of the second protective layer and applying a second DC bias, less than the first DC bias, to the substrate while sputter depositing the remainder of the second protective layer; or (c) sputter depositing the second protective layer while applying an initial DC bias of about 250V or less to the substrate and gradually decreasing the DC bias to about 50V or less until completely depositing the second protective layer.

* * * * *